United States Patent
Vetters et al.

(10) Patent No.: US 10,968,764 B2
(45) Date of Patent: Apr. 6, 2021

(54) CERAMIC MATRIX COMPOSITE HANGER HEAT SHIELD

(71) Applicants: Rolls-Royce Corporation, Indianapolis, IN (US); Rolls-Royce plc, London OT (GB)

(72) Inventors: Daniel K. Vetters, Indianapolis, IN (US); Jeffrey M. Crutchfield, Indianapolis, IN (US); Anthony G. Razzell, London (GB)

(73) Assignees: Rolls-Royce Corporation, Indianapolis, IN (US); Rolls-Royce plc

( * ) Notice: Subject to any disclaimer, the term of this patent is extended or adjusted under 35 U.S.C. 154(b) by 62 days.

(21) Appl. No.: 16/428,330

(22) Filed: May 31, 2019

(65) Prior Publication Data

US 2020/0378264 A1 Dec. 3, 2020

(51) Int. Cl.
| | |
|---|---|
| *F01D 11/08* | (2006.01) |
| *F01D 5/28* | (2006.01) |
| *F01D 25/00* | (2006.01) |
| *F01D 25/24* | (2006.01) |

(52) U.S. Cl.
CPC .............. *F01D 11/08* (2013.01); *F01D 5/284* (2013.01); *F01D 25/005* (2013.01); *F01D 25/24* (2013.01); *F05D 2240/11* (2013.01); *F05D 2240/15* (2013.01); *F05D 2300/175* (2013.01)

(58) Field of Classification Search
CPC ........ F01D 11/08; F01D 25/24; F01D 25/005; F01D 5/284; F05D 2240/11; F05D 2240/15; F05D 2300/175
See application file for complete search history.

(56) References Cited

U.S. PATENT DOCUMENTS

| 7,229,246 | B2 | 6/2007 | Ghasripoor et al. |
| 8,303,246 | B2 | 11/2012 | Drelon et al. |
| 9,915,153 | B2 | 3/2018 | Sener |
| 10,138,750 | B2 * | 11/2018 | McCaffrey ............... F01D 5/02 |
| 10,233,844 | B2 * | 3/2019 | Bogard ..................... F01D 5/08 |
| 10,422,247 | B2 * | 9/2019 | Kufner .................. F01D 25/246 |
| 10,428,689 | B2 * | 10/2019 | Schmidt .................... F01D 9/04 |
| 2014/0127457 | A1 | 5/2014 | Hillier |
| 2016/0333715 | A1 | 11/2016 | McCaffrey |
| 2016/0348523 | A1 | 12/2016 | Thomas et al. |
| 2017/0130600 | A1 | 5/2017 | Shapiro et al. |
| 2018/0106160 | A1 * | 4/2018 | Thomas ................ F01D 25/005 |

(Continued)

FOREIGN PATENT DOCUMENTS

| EP | 2458155 | A2 | 5/2012 | |
| EP | 3219927 | A1 * | 9/2017 | ............... F01D 9/04 |

(Continued)

OTHER PUBLICATIONS

Extended European Search Report, European Application No. 20172941. 5-1004, dated Sep. 25, 2020, 7 pages.

*Primary Examiner* — Brian P Wolcott
(74) *Attorney, Agent, or Firm* — Barnes & Thornburg LLP (57) ABSTRACT

A turbine shroud assembly of a gas turbine engine includes seal segments made from ceramic matrix composite materials. The mounting assembly used to support the seal segments has heat shields adapted to resist radiant heating from the seal segments, especially portions of the seal adjacent to a primary gas path along the turbine shroud assembly.

19 Claims, 6 Drawing Sheets

(56) References Cited

U.S. PATENT DOCUMENTS

| | | | |
|---|---|---|---|
| 2018/0149030 A1 | 5/2018 | Freeman et al. | |
| 2018/0149041 A1 | 5/2018 | Freeman et al. | |
| 2018/0149042 A1 | 5/2018 | Freeman et al. | |
| 2018/0355740 A1* | 12/2018 | Usseglio | F01D 11/005 |

FOREIGN PATENT DOCUMENTS

| | | |
|---|---|---|
| EP | 3309366 A1 | 4/2018 |
| WO | 2015088869 A1 | 6/2015 |

\* cited by examiner

FIG. 9

CERAMIC MATRIX COMPOSITE HANGER HEAT SHIELD

FIELD OF THE DISCLOSURE

The present disclosure relates generally to shroud assemblies, and more specifically to shroud assemblies for gas turbine engines.

BACKGROUND

Gas turbine engines are used to power aircraft, watercraft, power generators, and the like. Gas turbine engines typically include a compressor, a combustor, and a turbine. The compressor compresses air drawn into the engine and delivers high pressure air to the combustor. In the combustor, fuel is mixed with the high pressure air and is ignited. Products of the combustion reaction in the combustor are directed into the turbine where work is extracted to drive the compressor and, sometimes, an output shaft, fan, or propeller. In some applications, shroud assemblies define flow paths to assist in guiding exhaust products through the turbine.

SUMMARY

The present disclosure may comprise one or more of the following features and combinations thereof.

A turbine shroud assembly may include a carrier, a blade track segment, and a mounting assembly. The carrier may be configured to be coupled to a turbine case so as to fix other components of the turbine shroud assembly relative to the turbine case. The blade track segment may comprise ceramic matrix composite materials and may define a portion of a gas flow path. The mounting assembly may comprise a first metallic material and may be configured to couple the blade track segment to the carrier.

In some embodiments, the blade track segment may include a runner and an attachment member. The runner may extend at least partway about a central axis. The runner may have a flow surface and exterior surface. The flow surface may be arranged to define the gas flow path and the exterior surface may be spaced radially outward of the flow surface relative to the central axis. The attachment member may extend radially outward from the exterior surface of the runner.

In some embodiments, the mounting assembly may include a forward hanger, an aft hanger, and hanger heat shields. The forward hanger may extend radially inward from the carrier and engage the attachment member of the blade track segment to block radially inward movement of the blade track segment relative to the carrier. The aft hanger may be spaced axially aft of the forward hanger. The aft hanger may extend radially inward from the carrier and engage the attachment member of the blade track segment to block radially inward movement of the blade track segment relative to the carrier. The hanger heat shields may each comprise a second metallic material different from the first metallic material.

In some embodiments, the forward and aft hangers may each have a radially-inwardly facing surface. The radially-inwardly facing surface may be arranged in confronting relation to the exterior surface of the runner such that heat conducted from the flow surface of the runner to the exterior surface of the runner radiates toward the radially-inwardly facing surface of the forward and aft hangers.

In some embodiments, the hanger heat shields may be arranged radially between the exterior surface of the runner and the radially-inwardly facing surfaces of the forward and aft hangers. Each of the hanger heat shields may be arranged between the runner and the forward and aft hangers to reduce the amount of heat transfer to the forward and aft hangers from the exterior surface of the runner during use of the turbine shroud assembly.

In some embodiments, each of the hanger heat shields may include a shield panel and a first clip. The shield panel may be arranged between the exterior surface of the runner and the radially-inwardly facing surfaces of the forward and aft hangers. The first clip may extend radially outward from the shield panel and couple to a at least one of the forward and aft hangers.

In some embodiments, each of the hanger heat shields may include a second clip. The second clip may be axially spaced apart from the first clip. The second clip may extend radially outward from the shield panel and couple to at least one of the forward and aft hangers.

In some embodiments, the first material may be a nickel-based super alloy or a cobalt-based super alloy. In some embodiments, the second material may be a nickel-based super alloy or a cobalt-based super alloy.

In some embodiments, the forward hanger and the aft hanger may each include a bracket and a shaft. The bracket may engage one of a forward flange and an aft flange of the attachment member. The shaft may extend radially outward from the bracket to the carrier to couple the blade track segment to the carrier.

In some embodiments, the shaft may extend radially outward from the bracket through a hole formed in the carrier. The shaft may be formed to include threads that are engaged by a nut also included in the mounting system to selectively couple the corresponding hanger to the carrier.

In some embodiments, the mounting system may include a plurality of forward hangers and a plurality of aft hangers. The plurality of forward hangers may be spaced circumferentially apart around the central axis and the plurality of aft hangers may be spaced circumferentially apart around the central axis.

In some embodiments, the attachment member of the blade track segment may include a stalk, a forward flange, and an aft flange. The stalk may extend radially outward from the runner of the blade track. The forward flange may extend axially forward from the stalk at a radially outer end of the stalk to form a forward channel that opens axially forward. The aft flange may extend axially aft from the stalk at the radially outer end of the stalk to form an aft channel that opens axially aft.

In some embodiments, the forward hanger and the aft hanger may each include a bracket. The bracket may engage one of the forward flange and the aft flange of the attachment member.

In some embodiments, the bracket may include a body, and an axially extending arm, and load pads. The body may be coupled the shaft. The axially extending arm may extend axially inward from the body into the respective forward or aft channel of the blade track segment. The load pads may extend radially outward from the axially extending arm at an end of the arm spaced axially inward from the body and may engage the forward or aft flange of the attachment member in the respective channel. In some embodiments, the bracket may be T-shaped when viewed axially along the central axis.

In some embodiments, the bracket may include at least two load pads. The at least two load pads may be spaced circumferentially apart from one another to define an attachment gap therebetween.

In some embodiments, the hanger heat shield may include a first clip and a second clip. The first clip may extend around the body of the bracket to couple the hanger heat shield to the corresponding hanger. The second clip may extend around the axially extending arm and into the attachment gap between the load pads of the bracket to couple the hanger heat shield to the corresponding hanger.

According to another aspect of the present disclosure, a turbine shroud assembly may include a carrier, a blade track segment, and a mounting assembly. The carrier may be configured to be coupled to a turbine case so as to fix other components of the turbine shroud assembly relative to the turbine case. The blade track segment may comprise ceramic matrix composite materials. The mounting assembly may be configured to couple the blade track segment to the carrier.

In the illustrative embodiment, the blade track segment may include a runner and an attachment member. The runner may extend at least partway about a central axis. The runner may have a flow surface arranged to define a gas flow path and an exterior surface spaced radially outward of the flow surface relative to the central axis. The attachment member may extend radially outward from the exterior surface of the runner.

The mounting assembly may include a hanger and a hanger heat shield. The hanger may extend radially inward from the carrier and engage the attachment member of the blade track segment to block radially inward movement of the blade track segment relative to the carrier. In some embodiments, the hanger may have a radially-inwardly facing surface. The radially-inwardly facing surface may be spaced radially from and arranged in confronting relation to the exterior surface of the runner. The hanger heat shield may be arranged radially between exterior surface of the runner included in the blade track segment and the hanger to reduce the amount of heat transfer to the hanger from the radiant heating discharged from the runner included in the blade track segment.

In some embodiments, the hanger heat shield may include a shield panel, a first clip, and a second clip. The shield panel may be arranged between the exterior surface of the runner and the radially-inwardly facing surface of the hanger to shield the corresponding hanger from radiant heat. The first clip may extend radially outward from the shield panel and engage a first side of the corresponding hanger. The second clip may be axially spaced apart from the first clip. The second clip may extend radially outward from the shield panel and engage a second side of the corresponding hanger.

In some embodiments, the hanger may include a bracket and a shaft. The bracket may engage the attachment member to block radially inward movement of the blade track segment. The shaft may extend radially outward from the bracket to the carrier to couple the blade track segment to the carrier.

In some embodiments, the shaft may extend radially outward from the bracket through a hole formed in the carrier. The shaft may be formed to include threads that are engaged by a nut also included in the mounting system to selectively couple the corresponding hanger to the carrier.

In some embodiments, the hanger heat shield may include a shield panel, a first clip, and a second clip. The shield panel may extend at least partway about the central axis. The shield panel may be arranged between the exterior surface of the runner and the radially-inwardly facing surface of the hanger to shield the corresponding hanger from radiant heat. The first clip may extend radially outward from the shield panel and couple to a first side of the hanger. The second clip may be axially spaced apart from the first clip. The second clip may extend radially outward from the shield panel and couple to a second side of the corresponding hanger.

In some embodiments, the first clip of the hanger heat shield may include a first clip wall and a first clip head. The first clip wall may extend radially outward from a first edge of the shield panel along the first side of the hanger. The first clip head may extend axially inward from the first clip wall and engage the bracket to couple the hanger heat shield to the hanger.

In some embodiments, the second clip of the hanger heat shield may include a second clip wall and a second clip head. The second clip wall may extend radially outward form a second edge of the shield panel along the second side of the hanger. The second clip head may extend axially inward from the second clip wall and engage the bracket to couple the hanger heat shield to the hanger.

In some embodiments, the shield panel of the hanger heat shield may be spaced radially inward of the radially-inwardly facing surface of the hanger to locate a gap therebetween. The gap may be arranged to reduce the amount of heat transfer to the hanger from conductive heating caused by a temperature difference between the shield panel of the hanger heat shield and the radially-inwardly facing surface of the hanger during use of the turbine shroud assembly.

In some embodiments, the bracket of the hanger may extend at least partway about the central axis. The bracket may be shaped to include at least one attachment datum on a first side of the bracket and at least one attachment datum on a second side of the bracket. The at least one attachment datum on the first side of the bracket may axially extend into the first side of the bracket and the at least one attachment datum on the second side of the bracket may axially extends into the second side of the bracket.

In some embodiments, the first clip and the second clip of the hanger heat shield extend at least partway about the central axis. The first clip may include an attachment protrusion that extends from the first clip into the attachment datum formed in the first side of the bracket to couple the first clip to the first side of the bracket. The second clip may include an attachment protrusion that extends from the second clip into the attachment datum formed in the second side of the bracket to couple the second clip to the second side of the bracket.

In some embodiments, the bracket of the hanger may include at least two load pads. The at least two load pads may extend radially outward from a top surface of the bracket and engage the attachment member of the blade track segment.

These and other features of the present disclosure will become more apparent from the following description of the illustrative embodiments.

DETAILED DESCRIPTION OF THE DRAWINGS

For the purposes of promoting an understanding of the principles of the disclosure, reference will now be made to a number of illustrative embodiments illustrated in the drawings and specific language will be used to describe the same.

Figure 1:
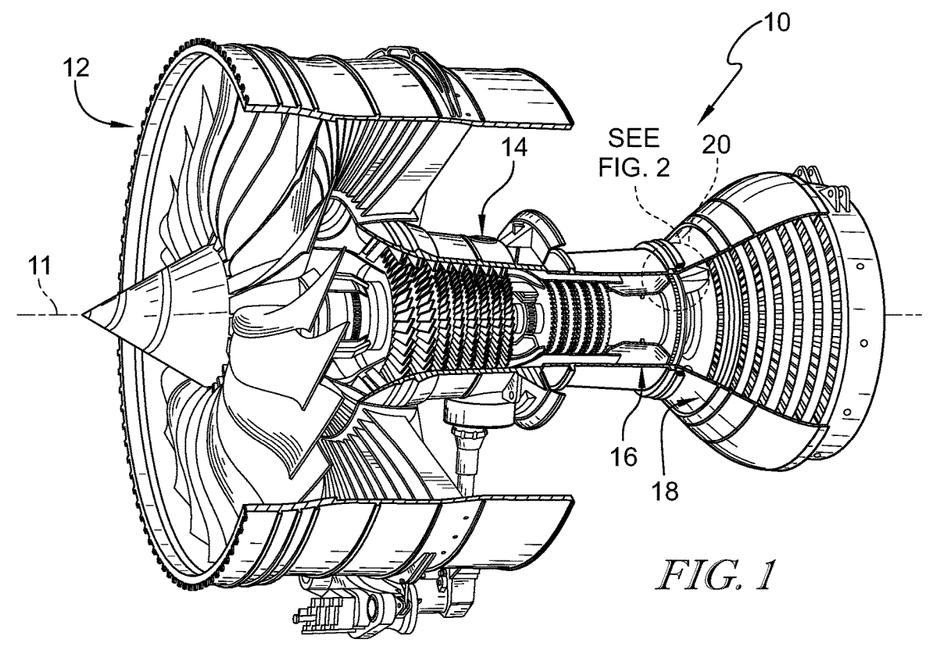
FIG. 1 is an perspective view of a gas turbine engine having a portion cut away to show that the gas turbine engine includes a fan, a compressor, a combustor, and a turbine section for expanding exhaust products from the combustion section.
Figure 2:
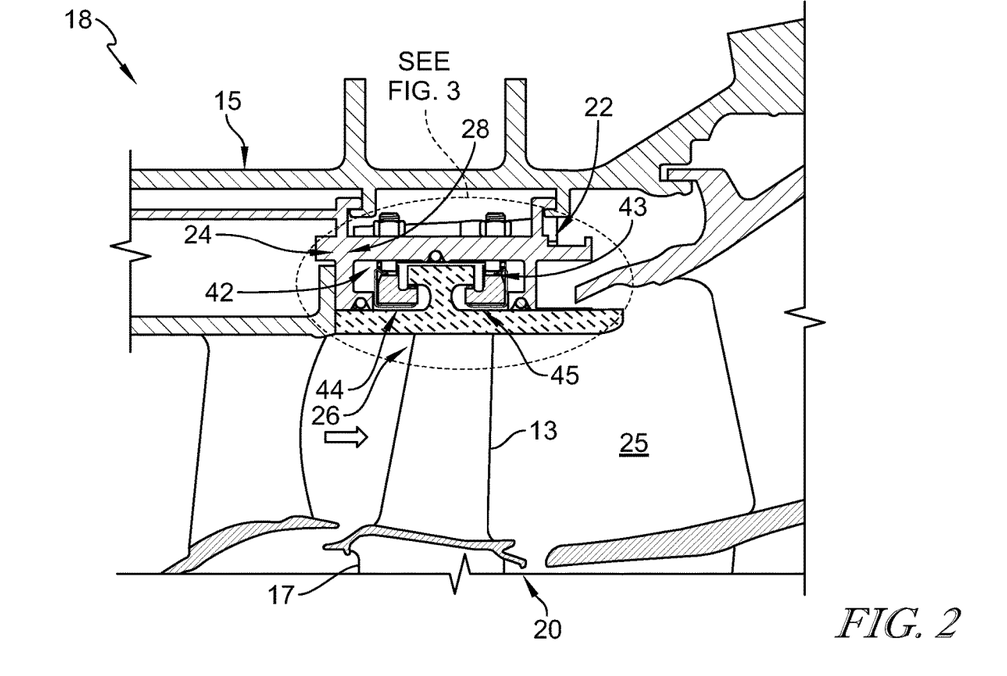
FIG. 2 is an elevation view of a portion of the gas turbine engine of FIG. 1 in cross-section along a central axis showing that the turbine section includes a turbine rotor, blades, and a shroud assembly disposed about the rotor and blades to provide a flow surface to guide exhaust products from the combustor through the turbine section; and showing that the shroud assembly includes a carrier coupled to a turbine case, a blade track segment comprising ceramic matrix composite materials, and a mounting assembly configured to couple the blade track segment to the carrier.

A turbine shroud assembly according to the present disclosure is adapted for use in a gas turbine engine 10 as suggested in FIGS. 1 and 2. The fan 12 is driven by the turbine 18 and provides thrust for propelling an air vehicle. The compressor 14 compresses and delivers air to the combustor 16. The combustor 16 mixes fuel with the compressed air received from the compressor 14 and ignites the fuel. The hot, high-pressure products of the combustion reaction in the combustor 16 are directed into the turbine 18 to cause the turbine 18 to rotate about a central axis 11 and drive the compressor 14 and the fan 12.

The turbine 18 includes at least one turbine wheel assembly 20 and a turbine shroud 21 positioned to surround the turbine wheel assembly 20 as shown in FIGS. 1 and 2. The turbine shroud 20 is coupled to an outer case 15 of the gas turbine engine 10 and includes a plurality of blades 13 coupled to a rotor disk 17 for rotation therewith. The hot, high pressure combustion products from the combustor 16 are directed toward the blades 13 of the turbine wheel assemblies 20 along a flow path 25. The turbine shroud 21 extends around the turbine wheel assembly 20 to block the combustion products from passing over the blades 13 without pushing the blades 13 to rotate as suggested in FIG. 2. In the illustrative embodiment, the turbine shroud 20 is made up of a number of turbine shroud assemblies 22 that extend only part-way around the central axis 11 and cooperate to surround the turbine wheel assembly 20.

The shroud assembly 22 includes a carrier 24, a blade track segment 26, and a mounting assembly 28 with component heat shields 44, 45 as shown in FIGS. 2-5. The carrier 24 is a metallic component configured to be coupled to a turbine case 15 so as to fix other components of the turbine shroud assembly 22 relative to the turbine case 15. The blade track segment 26 comprises ceramic matrix composite materials and is arranged radially outward of the blades 13. The blade track segment 26 forms a flow surface 32 facing radially inward toward the gas path 25 to guide the combustion products to engage the blades 13 through the turbine section 18. The mounting assembly 28 is configured to couple the blade track segment 26 to the carrier 24 and hold the blade track segment 26 in place such that the blade track segment 26 is properly located.

Figure 3:
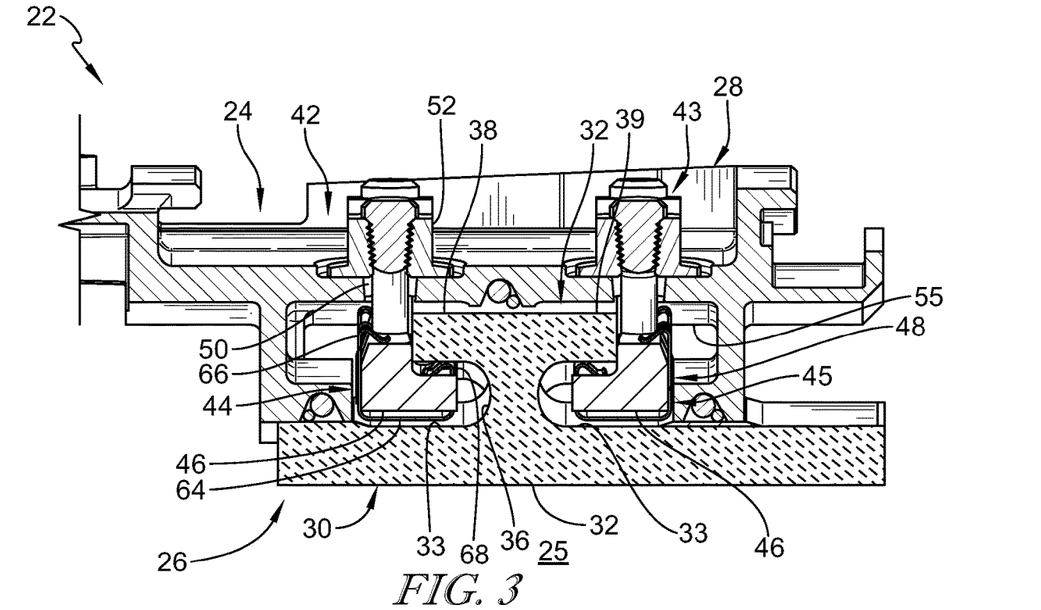
FIG. 3 is a detail view of the shroud assembly of FIG. 2 showing the mounting assembly includes hangers that extend radially inward from the carrier to engage the blade track segment and hanger heat shields that are arranged radially between the blade track segment and the hangers to reduce the heat transfer to the hangers during use of the turbine shroud assembly.
Figure 4:
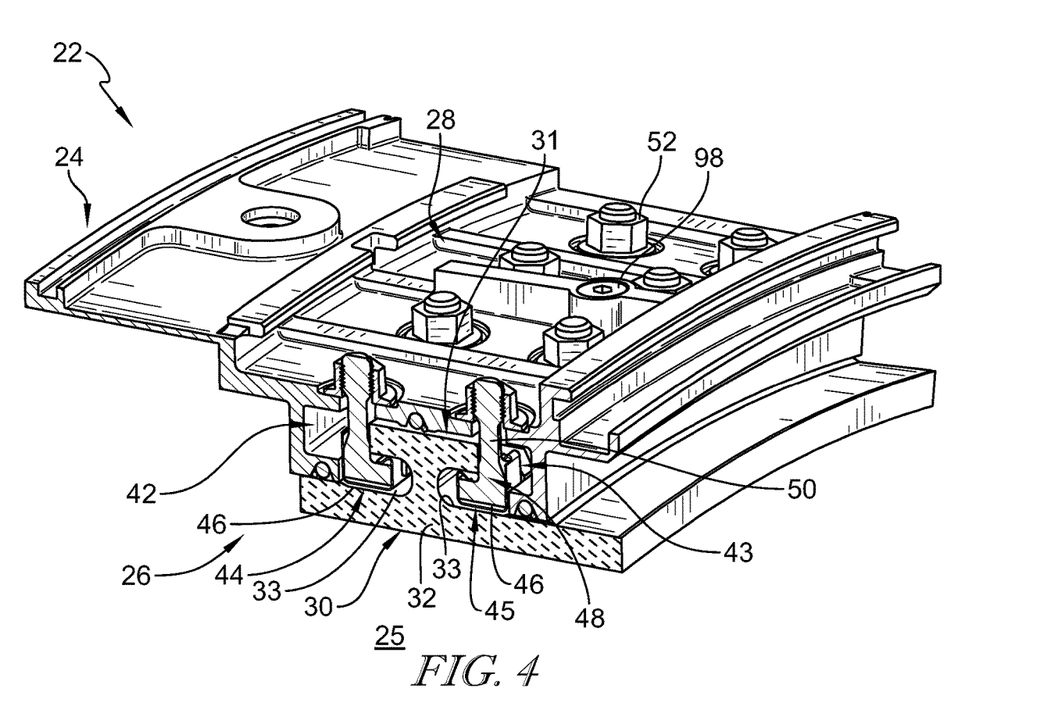
FIG. 4 is a sectioned perspective view of the shroud assembly of FIG. 2 showing that the hangers are configured to support the blade track segment, and showing that the hangers are bolted to the carrier with fastener nuts to selectively couple the hangers to the carrier.
Figure 5:
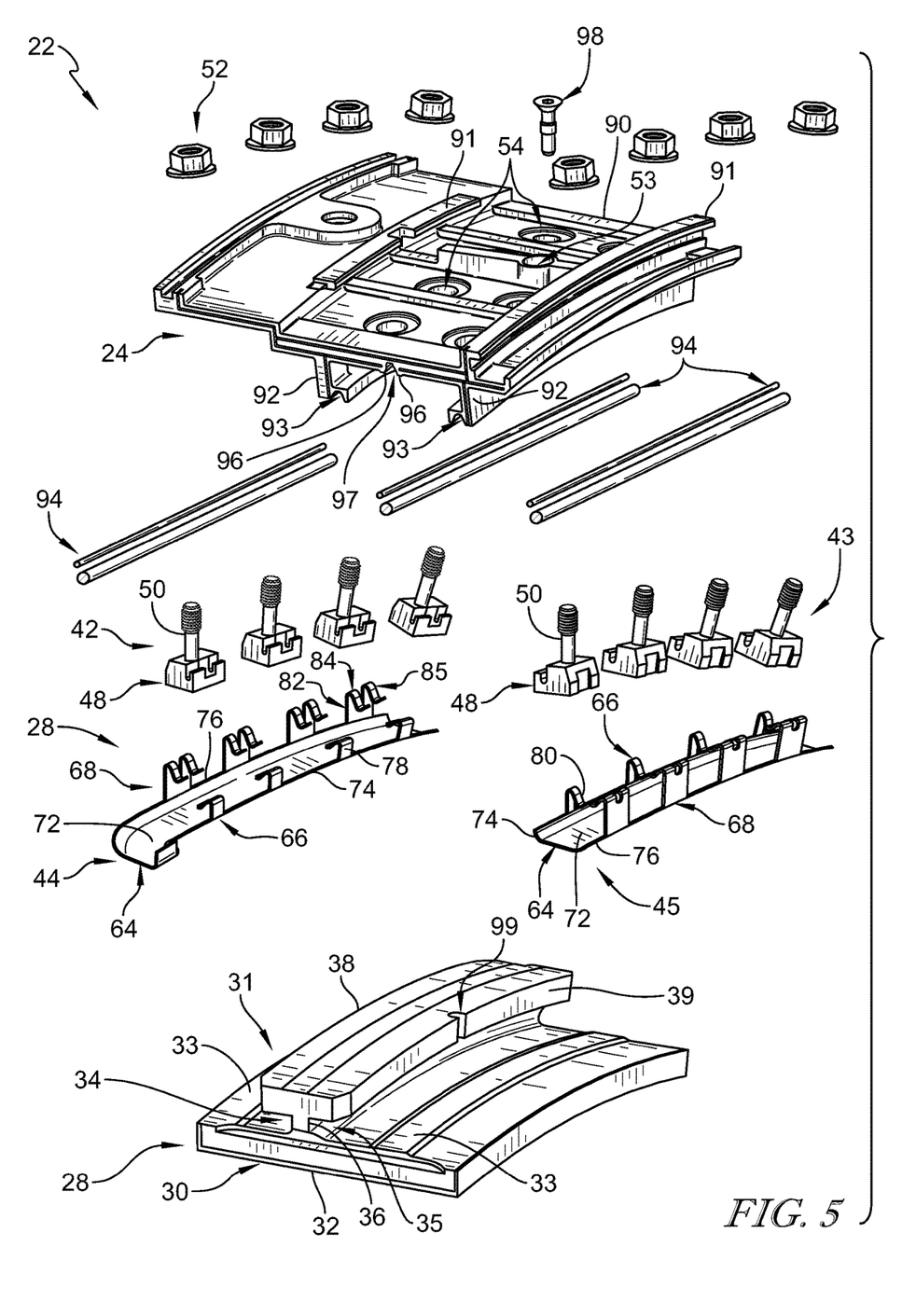
FIG. 5 is an exploded view of the shroud assembly of FIG. 2 showing that the each hanger includes a bracket that engages an attachment member of the blade track segment and a shaft that extends radially to the carrier to couple the blade track segment to the carrier, and showing that the hanger heat shield includes clips to couple the hanger heat shield to the bracket of the respective hanger.

The blade track segment 26 includes a runner 30 that forms the flow surface 32 of the gas path 25 and an attachment member 31 that connects with the runner 30 and extends radially outward therefrom as shown in FIGS. 3-5. The runner 30 extends at least partway about the central axis 11 and also includes an exterior surface 33 that is spaced radially outward of the flow surface 32 relative to the axis 11 to form the shape of the runner 30. The attachment member 31 includes a stalk 36 that extends radially outward from the exterior surface 33 of the runner 30 to an end and forward and aft flanges 38, 39 that extend axially outward from the stalk 36 at the end in opposite directions from each other. As shown in FIG. 3, the forward and aft flanges 38, 39 each generally extend axially from the stalk 36 parallel to the axis 11 to form an I-beam shape of the attachment member 31.

The mounting assembly 28 includes a forward hanger 42, an aft hanger 43, a forward heat shield 44, and an aft heat shield 45 as shown in FIGS. 2-5. The forward and aft hangers 42, 43 comprising a first metallic material extend radially inward from the carrier 24 and engage one of the forward flange 38 and the aft flange 39 of the blade track segment 26 to block radially inward movement of the blade track segment 26 relative to the carrier 24. The forward and aft hangers 42, 43 each have a radially-inwardly facing surface 46 spaced axially inward and in confronting relation to the exterior surface 33 of the blade track segment 26. The forward hanger heat shield 44 and aft hanger heat shield 45 comprise a second metallic material different from the first metallic material of the hangers 42, 43 and are arranged between the runner 30 of the ceramic matrix composite blade track segment 26 and the corresponding hanger 42, 43.

During use of the gas turbine engine 10, the ceramic matrix composite material of the blade track segment 26 heats up due to the high temperature exhaust gases passing over the flow surface 32 of the blade track segment 26 causing a temperature difference between the blade track segment 26 and the forward and aft hangers 42, 43. As such, the exterior surface 33 of the blade track segment 26 radiates heat to the radially-inwardly facing surfaces 46 of the forward and aft hangers 42, 43 that are in confronting relation to the exterior surface 33.

The forward hanger heat shield 44 and aft hanger heat shield 45 are arranged radially between the exterior surface 33 of the runner 30 and the radially-inwardly facing surfaces 46 of the forward and aft hangers 42, 43 to reduce the amount of heat transfer to the forward and aft hangers 42, 43 from the exterior surface 33 of the runner 30 during use of the turbine shroud assembly 22. In the illustrative embodiment, each hanger heat shield 44, 45 is radially spaced apart from the radially-inwardly facing surface 46 of the hanger 42, 43 to form a gap 77 therebetween. The gap 77 reduces the amount of conductive heating between the hanger heat shields 44, 45 and the forward and aft hangers 42, 43 further minimizing the amount of heat transferred to the hangers 42, 43 from the blade track segment 26.

In the illustrative embodiment, the first material of the forward and aft hangers 42, 43 is a nickel-based super alloy or a cobalt-based super alloy and the second material of the forward and aft hanger heat shields 44, 45 is a nickel-based super alloy or a cobalt-based super alloy. In other embodiments, the second material of the forward and aft hanger heat shields 44, 45 may be another suitable material.

In the illustrative embodiment, the mounting assembly 28 further includes a plurality of forward hangers 42 and a plurality of aft hangers 43 that are arranged to support the single blade track segment 26 as shown in FIG. 5. The plurality of forward hangers 42 are spaced circumferentially apart about the axis 11 and each engage the forward flange 38 of the blade track segment 26 to distribute contact loads along a circumferential length of the forward flange 38. The plurality of aft hangers 43 are spaced circumferentially apart about the axis 11 and each engage the aft flange 39 of the blade track segment 26 to distribute contact loads along a circumferential length of the aft flange 39. The plurality of forward and aft hangers 42, 43 spread the contact load along the circumferential length of the attachment member 31 through the load pads 60.

The forward hanger heat shield 44 and aft hanger heat shield 45 are arranged to extend partway about the axis 11. The forward hanger heat shield 44 couples to the plurality of forward hangers 42 supporting the blade track segment 26 and is configured to shield the plurality of forward hangers 42 while connecting plurality of forward hangers 42 together so that upon failure of one forward hanger 42 the mounting assembly 28 would continue to support the segment 26. The aft hanger heat shield 45 couples to the plurality of aft hangers 43 supporting the blade track segment 26 and is configured to shield the plurality of aft hangers 43 while connecting plurality of aft hangers 43 together so that upon failure of one aft hanger 43, the mounting assembly 28 would continue to support the segment 26. In this way, the forward and aft hanger heat shields 44, 45 group together the forward hangers 42 and the aft hangers 43 such that a damaged or failed hanger 42, 43 is prevented from further damaging other components of the shroud assembly 22.

Figure 6:
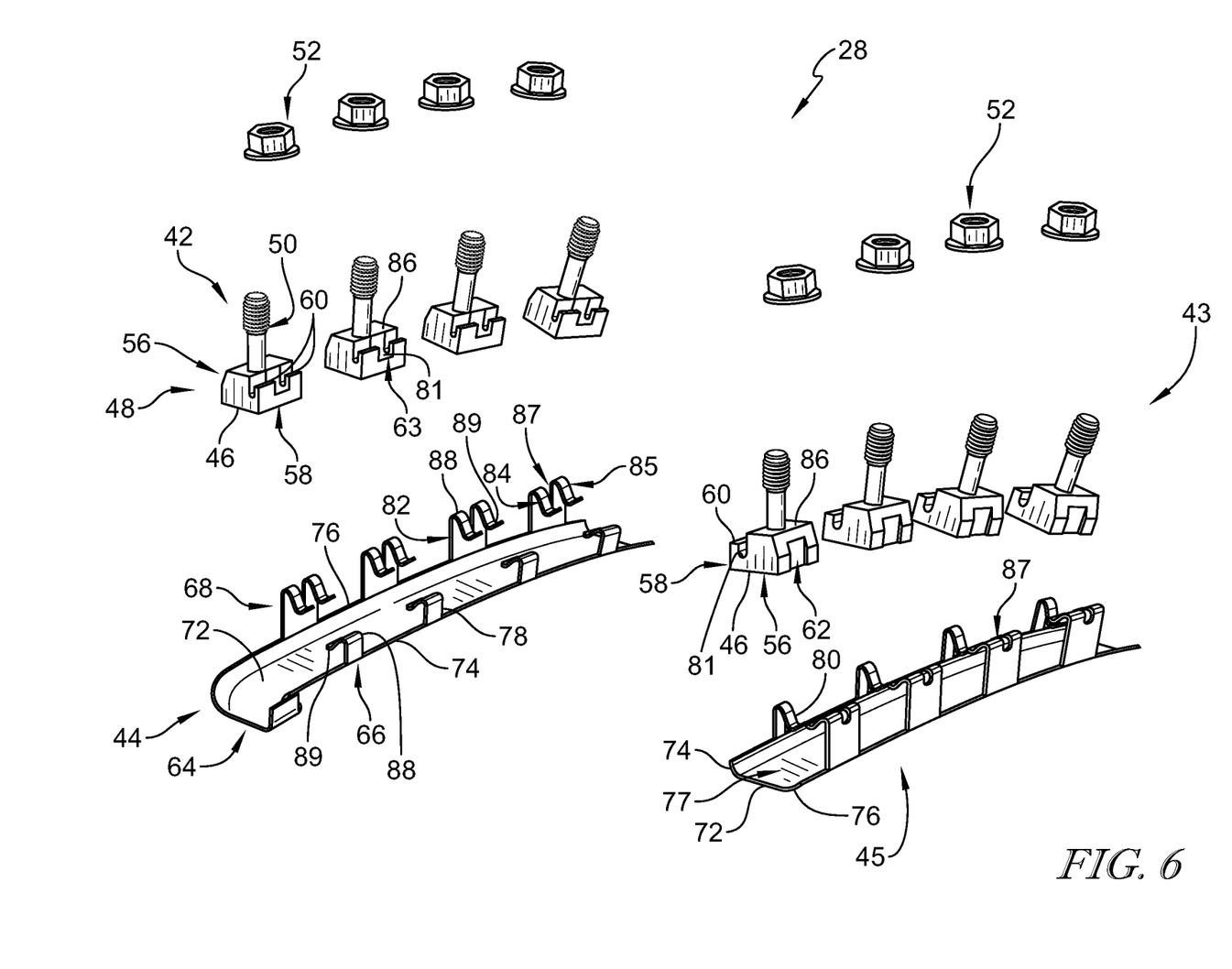
FIG. 6 is an exploded view of the mounting assembly included in the shroud assembly of FIG. 2 showing each hanger heat shield includes a shield panel that extends along a radially-innwardly facing surface the hangers and a plurality of clips that extend radially outward from the shield panel and couple to a bracket of each hanger.

Each of the heat shields 44, 45 includes a shield panel 64, an arm clip 66, and a body clip 68 as shown in FIGS. 4-6. The shield panel 64 is arranged between the exterior surface 33 of the runner 30 and the radially-inwardly facing surface 46 of the forward and aft hangers 42, 43. The shield panel 64 extends a width of the radially-inwardly facing surface 46 to shield the radially-inwardly facing surface 46 from the heat radiating from the exterior surface 33 of the runner 30. The arm clip 66 that extends radially outward from the shield panel 64 and couples to at least one of the forward and aft hangers 42, 43. The body clip 68 is axially spaced apart from the arm clip 66 and extends radially outward from the shield panel 64 and couples to at least one of the forward and aft hangers 42, 43.

In the illustrative embodiment, the shield panel 64 of each hanger heat shield 44, 45 extends partway about the axis 11 and each hanger heat shield 44, 45 includes a plurality of arm clips 66 and a plurality of body clips 68 coupled to the respective shield panel 64. The plurality of arm clips 66 are spaced apart circumferentially along a first edge 74 of the shield panel 64 and couple the respective hanger 42, 43 to the shield panel 64. The plurality of body clips 68 are also spaced apart circumferentially along a second edge 76 of the shield panel 64 and couple the respective hanger 42, 43 to the shield panel 64. The plurality of arm and body clips 66, 68 couple the plurality of hangers 42, 43 to the shield panel 64 to prevent any failed or damaged hanger 42, 43 from damaging other components of the shroud assembly 22.

The shield panel 64 includes a flat base panel 72, the first fillet edge 74, and the second fillet edge 76 as shown in FIGS. 3-5. The flat base panel 72 is arranged between the exterior surface 33 of the runner 30 and the radially-inwardly facing surface 46 of the hanger 42, 43. The flat base panel 72 is radially spaced apart from the radially-inwardly facing surface 46 of the hanger 42, 43 to form the gap 77 therebetween. The first fillet edge 74 extends from the flat base panel 72 toward the radially-inwardly facing surface 46 of the bracket 48 formed by the arm 58 of the bracket 48. The second filled edge 76 extends from the flat base panel 72 toward the radially-inwardly facing surface 46 of the bracket 48 formed by the body 56 of the bracket 48. In the illustrative embodiment, both the first and second fillet edges 74, 76 engage the radially-inwardly facing surface 46 of the bracket 48 to maintain the gap 77 between the radially-inwardly facing surface 46 and the flat base panel 72.

Turning again to the hangers 42, 43, each of the forward hangers 42 and the aft hangers 43 include a bracket 48, a shaft 50, and a fastener nut 52 as shown in FIG. 3. At least a portion of the forward bracket 48 of each forward hanger 42 is arranged at least partway in a forward channel 34 of the attachment member 31 defined between the forward flange 38 and the runner 30 and engages the forward flange 38 of the attachment member 31. At least a portion of the aft bracket 48 of each aft hanger 43 is arranged at least partway in an aft channel 35 defined between the aft flange 39 and the runner 30 and engages the aft flange 39 of the attachment member 31. The shaft 50 of each forward and aft hanger 42, 43 extends radially outward from each bracket 48 to the carrier 24.

In the illustrative embodiment, the shaft 50 extends radially outward from the bracket 48 through a hole 54 formed in the carrier 24 and is formed to include threads that are engaged by the fastener nut 52 to selectively couple the corresponding hanger 42 to the carrier 24. The shaft 50 is therefore adjustably suspended from the carrier 24 by the respective fastener nut 52 such that a user can adjust each respective fastener nut 52 to define a height that is embodied as a distance between the radially-inwardly facing surface 46 of the respective bracket 48 and an inner surface 55 of the carrier 24.

In some embodiments, the adjustable height permits tuning of contact points along the radial (and circumferential direction) between the carrier 24 and the attachment member 31 of the blade track segment 26 to distribute loads precisely throughout the shroud assembly 22. In the illustrative embodiment, the shafts 50 of each hanger 42, 43 coupling the segment 26 to the carrier 24 seat the attachment member 31 against the contact points or datums 96 on the inside surface 55 of the carrier 24 to precisely locate the flow path surface 32 while also accommodating the rough surface and loose tolerances on the underside of the ceramic blade track segment 26 in the channels 34, 35. The fastener nuts 52 and threaded shafts 50 allow adjustabliltiy in the radial direction as well as tilting of the ceramic segment 26 to accommodate the rough surface and loose contact points at or near the data points 96 of the carrier 24.

In the illustrative embodiment, each bracket 48 has an L-shaped cross-sectional shape when viewed circumferentially along the blade track segment 26 such that the bracket 48 of each hanger 42, 43 includes a body 56 and an axially extending arm 58 as shown in FIGS. 3-5. The body 56 is coupled to the threaded shaft 50 of the hanger 42, 43. The axially extending arm 58 extends axially from the body 56 into the respective forward or aft channel 34, 35 of the blade track segment 26.

Each bracket 48 is also shaped to include load pads 60 as shown in FIGS. 3-5. The load pads 60 extend radially outward from the arm 58 at an end of the arm 58 spaced axially inward from the body 56. The load pads 60 engage the forward flange 38 or the aft flange 39 of the attachment member 31 in the respective channel 34, 35. In the illustrative embodiment, each bracket 48 includes two load pads 60 spaced circumferentially apart from one another to define an attachment gap 61 therebetween.

In the illustrative embodiment, the body 56 and the arm 58 of each bracket 48 form the radially-inwardly facing surface 46 of the bracket 48. The body 56 is also shaped to include a clip channel 62 that extends radially through the body 56. The arm 58 is also formed to include a clip channel 63 that extends radially through the arm 58 circumferentially between the loads pads 60, as shown in FIG. 6.

In the illustrative embodiment, the arm clip 66 extends radially outward from the first edge 74 of the shield panel 64 and around the arm 58 of the bracket 48. The body clip 68 extends radially outward from the second edge 76 of the shield panel 64 and around the body 56 of the bracket 48. The clips 66, 68 extend around the body 56 and the arm 58 of the bracket 48 to couple the heat shield 44, 45 to the respective hanger 42, 43.

Each arm clip 66 includes a wall 78 and an arm clip head 80 as shown in FIGS. 3-5. The wall 78 extends radially outward from the first fillet edge 74 and along the arm 58 in the clip channel 63 formed in the arm 58 of the bracket 48. The arm clip head 80 axially extends from the wall 78 through the attachment gap 61 between the load pads 60 and engages a top surface 81 of the arm 58 to couple the heat shield 44, 45 to the hanger 42, 43.

Each body clip 68 includes a wall 82 and a body clip head 84 as shown in FIGS. 3-5. The wall 82 extends radially outward from the second fillet edge 76 and along the body 56 in the clip channel 62 formed in the body 56 of the bracket 48. The clip head 84 axially extends from the wall 82 and engages a top surface 86 of the body 56 to couple the heat shield 44, 45 to the hanger 42, 43.

In the illustrative embodiment, the body clip head 84 includes two clips 84, 85 as shown in FIGS. 3-5. The clips 84, 85 extend from the wall 82 and are circumferentially spaced apart to form a shaft gap 87 therebetween. The clips 84, 85 extend toward and engage the top surface 86 of the body 56 such that the shaft 50 of the hanger 42, 43 is positioned within the shaft gap 87 between the clips 84, 85.

Each clip head 80, 84, 85 includes a flexible hook portion 88 and a lip portion 89 as shown in FIG. 6. The flexible hook portion 88 extends from the wall 78, 82 of the clip 66, 68 and curves radially inward from the wall 78, 82. The lip portion 89 extends from the flexible hook portion 88 and curves radially outward so that the lip portion 89 contacts the top surface 81, 86 of the bracket 48. The flexible hook portion 88 biases the lip portion 89 toward the top surface 81, 86 of the bracket 48 to maintain contact with the top surface 81, 86 and couple the heat shield 44, 45 to the hanger 42, 43.

In the illustrative embodiment, the flexible hook portion 88 allows the bracket 48 of each hanger 42, 43 to be pushed into place on the heat shield 44, 45 by flexing radially inward so that the hanger 42, 43 may be arranged in place on the heat shield 44, 45. Once the hanger 42, 43 is in place, the flexible hook portion 88 snaps over the top surface 81, 86 and biases the lip portion 89 toward the top surface 81, 86 of the bracket 48.

Turning again to the carrier 24, the carrier includes a body plate 90, case hangers 91, and forward and aft seal supports 92 as shown in FIGS. 3-5. The body plate 90 is an arcuate plate shaped to extend part-way around the central axis 11 and formed to include holes 54 through which the shafts 50 of the hangers 42, 43 extend. The case hangers 91 are configured to couple the shroud segment 22 to the outer casing 15 or other structure and extend radially outward from the body plate 90. The forward and aft seal supports 92 extend radially inward from the body plate 90. Each seal support 92 defines a corresponding seal-receiving channel 93 that receives a tandem seal 94 included in the shroud assembly 22.

The body plate 90 of the carrier 24 includes data points 96, a seal channel 97, and the attachment holes 54 as shown in FIG. 3. The data points 96 project radially inward from the inner surface 55 and engage the attachment member 31 at the outer surface 83 thereof near the end of the stalk 36. The data points 96 form the contact points along the radial (and circumferential direction) between the carrier 24 and the attachment member 31 of the blade track segment 26 to distribute loads precisely throughout the shroud assembly 22. The seal channel 97 is arranged between the data points 96 and is configured to receive a tandem seal member 94 that engages with the outer surface 83 of the attachment member 31 to define a pressure boundary between pressure cavities formed on the forward and aft sides of the blade track segment 26 between the carrier 24 and the blade track segment 26.

In the illustrative embodiment, the shroud assembly 22 further includes an anti-rotation rotation pin 98 as shown in FIGS. 3-5. The anti-rotation pin 98 extends through an anti-rotation pin hole 53 formed in the body panel 90 of the carrier 24 and into an anti-rotation slot 99 formed in the attachment member 31 of the blade track segment 26. The anti-rotation pin 98 extends into the anti-rotation slot 99 of the blade track segment 26 to block circumferential rotation of the blade track segment 26 about the axis 11.

Another embodiment of a turbine shroud assembly 222 in accordance with the present disclosure is shown in FIGS.

7-9. The turbine shroud assembly 222 is substantially similar to the turbine shroud assembly 22 shown in FIGS. 1-5 and described herein. Accordingly, similar reference numbers in the 200 series indicate features that are common between the turbine shroud assembly 22 and the turbine shroud assembly 222. The description of the turbine shroud assembly 22 is incorporated by reference to apply to the turbine shroud assembly 222, except in instances when it conflicts with the specific description and the drawings of the turbine shroud assembly 222.

Figure 7:
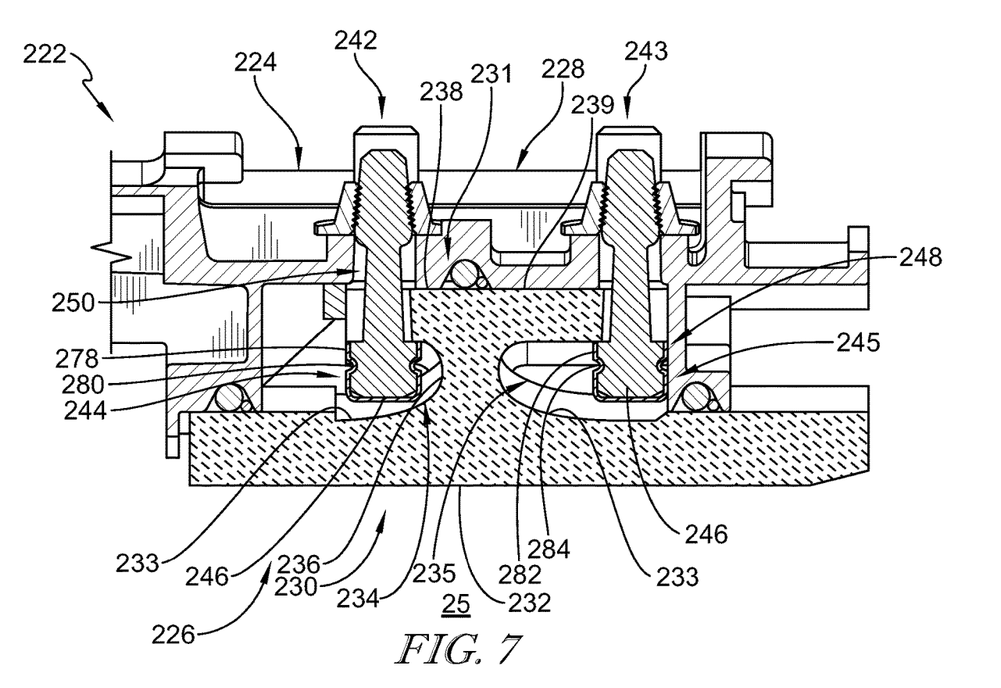
FIG. 7 is a detail view of another shroud assembly for use in the gas turbine engine of FIG. 1 showing the shroud assembly includes a carrier coupled to a turbine case, a blade track segment comprising ceramic matrix composite materials, and a mounting assembly configured to couple the blade track segment to the carrier, and further showing that the mounting assembly includes hangers that each extend radially inward from the carrier to engage the blade track segment and hanger heat shields that are arranged between the blade track segment and the hangers to reduce heat transfer to the hangers from the runner during use of the turbine shroud assembly.
Figure 8:
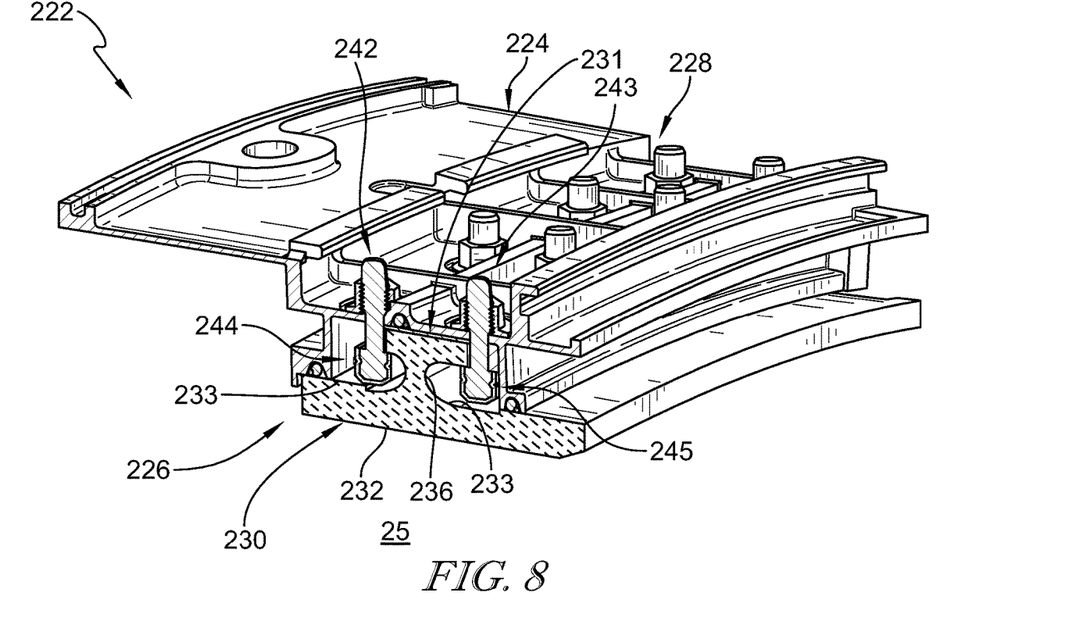
FIG. 8 is a sectioned perspective view of the shroud assembly of FIG. 7 showing that a plurality of hangers are configured to support the blade track segment, and showing that the hangers are bolted to the carrier with fastener nuts to selectively couple the plurality of hangers to the carrier.
Figure 9:
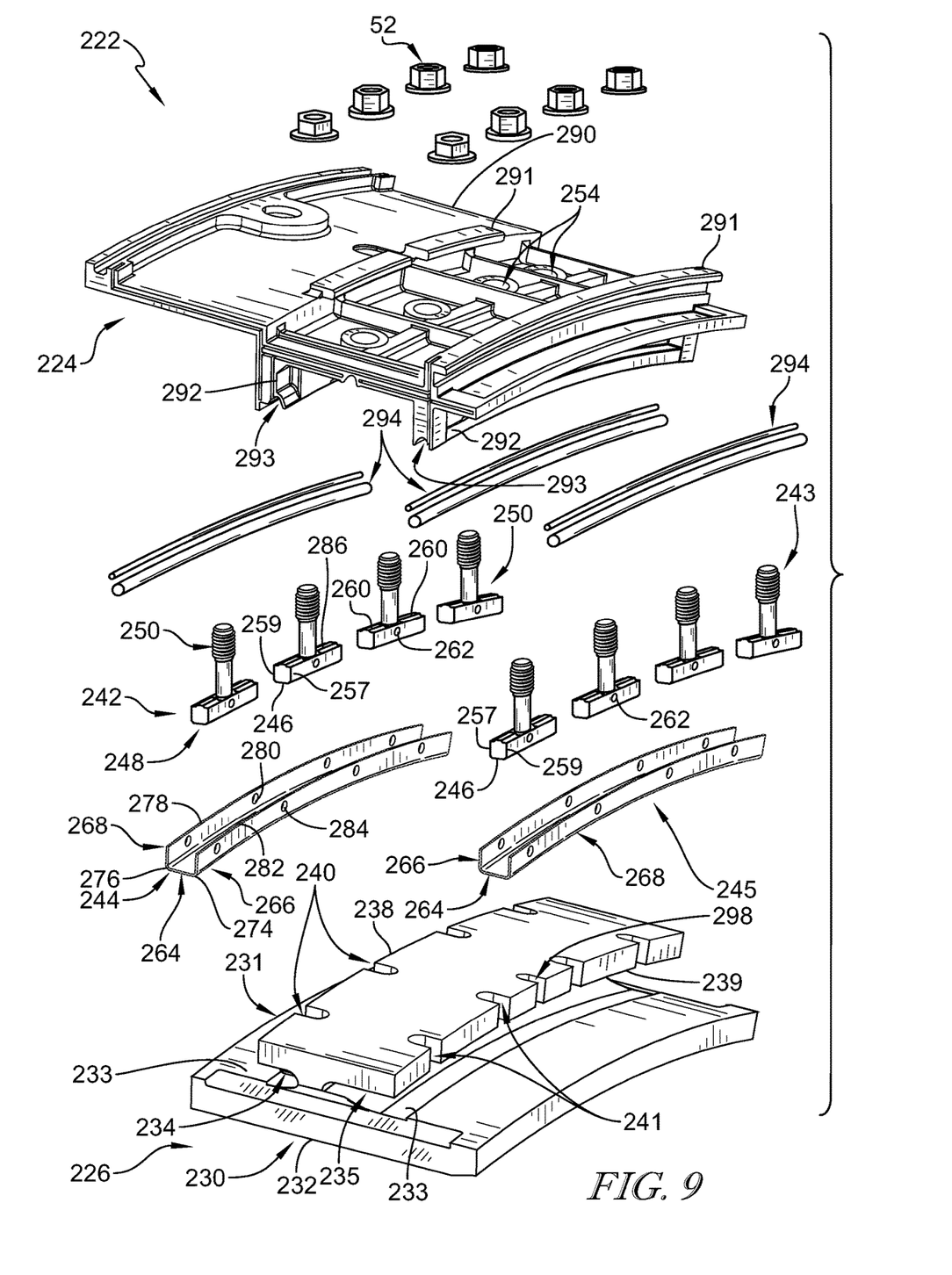
FIG. 9; is an exploded view of the shroud assembly of FIG. 7 showing the hanger heat shields each include a shield panel that extends along a radially-inwardly facing surface of the hanger, a first clip that extends radially outward from the shield panel and couples to a bracket of each hanger, and a second clip spaced axially aft from the first clip that extends radially outward from the shield panel and couples to the bracket of each hanger, and showing the first and second clips include attachment protrusions that extend axially inward to engage attachment indentations formed in each hanger to couple the heat shield to the hangers.

The shroud assembly 222 includes a carrier 224, a blade track segment 226, and a mounting assembly 228 as shown in FIGS. 7-9. The carrier 224 is a metallic component supported by the outer casing 15 and is configured to support the blade track segment 226 in position adjacent to the blades 13 of the turbine wheel assembly 20. The blade track segment 226 comprises ceramic matrix composite materials and is arranged radially outward of the blades 13. The blade track segment 226 forms a flow surface 230 facing radially inward toward the gas path 23 to guide the combustion products to engage the blades 13 through the turbine section 18. The mounting assembly 228 is configured to couple the blade track segment 226 to the carrier 224 and hold the blade track segment 226 in place such that the blade track segment 226 is properly located.

The blade track segment 226 includes a runner 230 and an attachment member 231 as shown in FIGS. 7-9. The runner 230 extends at least partway about the central axis 11 and forms the flow surface 232 that defines the gas flow path 25. The runner 230 also includes an exterior surface 233 that is spaced radially outward of the flow surface 232 relative to the axis 11 to form the shape of the runner 230. The attachment member 231 extends radially outward from the runner 230 relative to the axis 11.

The attachment flange 233 includes a stalk 236, a forward flange 238, and an aft flange 239 as shown in FIGS. 3-5. The stalk 236 extends radially outward from connection with the runner 230 to an end. The forward flange 238 extends axially forward from the stalk 236 at the radially outer end of the stalk 236 to form a forward channel 234 that opens axially forward. The aft flange 239 extends axially aft from the stalk 236 at the radially outer end of the stalk 236 to form an aft channel 235 that opens axially aft. In the illustrative embodiment, the forward and aft flanges 238, 239 extend from the stalk 236 generally parallel with the axis 11. The stalk 236 and the forward and aft flanges 238, 239 form an I-beam shape of the attachment member 231 of the blade track segment 226.

The forward and aft flanges 238, 239 are each formed to include hanger slots 240, 241 as shown in FIGS. 7-9. The forward flange 238 includes a forward hanger slot 240 that extends radially through the forward flange 238. The aft flange 239 includes an aft hanger slot 241 that extends radially through the aft flange 239. In the illustrative embodiment, the forward and aft flanges 238, 239 include a plurality of hanger slots 240, 241 that are circumferentially spaced apart from one another. Each of the hanger slots 240, 241 is configured to receive a portion of the mounting assembly 228.

In the illustrative embodiment, the aft flange 239 is also formed to include an anti-rotation slot 299 as shown in FIG. 9. The anti-rotation slot 299 is arranged between adjacent hanger slots 241 and is configured to receive an anti-rotation tab formed in the carrier 224.

The mounting assembly 228 includes a forward hanger 242, an aft hanger 243, a forward heat shield 244, and an aft heat shield 245 as shown in FIGS. 7-9. The forward and aft hangers 242, 243 comprising a first metallic material extend radially inward from the carrier 224 and engage one of the forward flange 238 and the aft flange 239 of the blade track segment 226 to block radially inward movement of the blade track segment 226 relative to the carrier 224. The forward and aft hangers 242, 243 each have a radially-inwardly facing surface 246 spaced axially inward and in confronting relation to the exterior surface 233 of the blade track segment 226.

The forward hanger heat shield 244 and aft hanger heat shield 245 comprise a second metallic material different from the first metallic material of the hangers 242, 243 and are arranged between the runner 230 of the ceramic matrix composite blade track segment 226 and the corresponding hanger 242, 243. The forward hanger heat shield 244 and aft hanger heat shield 245 are arranged radially between the exterior surface 233 of the runner 230 and the radially-inwardly facing surfaces 246 of the forward and aft hangers 242, 243 to reduce the amount of heat transfer to the forward and aft hangers 242, 243 from the exterior surface 233 of the runner 230 during use of the turbine shroud assembly 222.

In the illustrative embodiment, a plurality of forward hangers 242 and a plurality of aft hangers 243 are arranged to support the single blade track segment as shown in FIG. 9. The plurality of forward hangers 242 are spaced circumferentially apart about the axis 11 and each engage the forward flange 238 of the blade track segment 226 to distribute contact loads along a circumferential length of the forward flange 238. The plurality of aft hangers 243 are spaced circumferentially apart about the axis 11 and each engage the aft flange 239 of the blade track segment 226 to distribute contact loads along a circumferential length of the aft flange 239. The plurality of forward and aft hangers 242, 243 spread the contact load along the circumferential length of the attachment member 231 through the load pads 260.

The forward hanger heat shield 244 and aft hanger heat shield 245 are arranged to extend partway about the axis 11. The forward hanger heat shield 244 couples to the plurality of forward hangers 242 supporting the blade track segment 226 and is configured to shield the plurality of forward or aft hangers 242, 243 while connecting plurality of forward or aft hangers 242, 243 together so that upon failure of one forward hanger 242, 243, the mounting assembly 228 would continue to support the segment 226. The aft hanger heat shield 245 couples to the plurality of aft hangers 243 supporting the blade track segment 226 and is configured to shield the plurality of aft hangers 243 while connecting plurality of aft hangers 243 together so that upon failure of one aft hanger 243, the mounting assembly 228 would continue to support the segment 226. In this way, the forward and aft hanger heat shields 244, 245 group together the forward hangers 242 and the aft hangers 243 such that damaged hanger 242, 243 is prevented from further damaging other components of the shroud assembly 222.

The forward hanger 242 and the aft hanger 243 each include a bracket 248, a shaft 250, and a fastener nut 252 as shown in FIG. 7. The forward bracket 248 of the forward hanger 242 is arranged in the forward channel 234 of the blade track segment 226 and engages the forward flange 238 of the attachment member 231. The aft bracket 248 of the aft hanger 243 is arranged in the aft channel 235 of the blade track segment 226 and engages the aft flange 239 of the attachment member 231. The shaft 250 extends radially outward from the bracket 248 to the carrier 224.

In the illustrative embodiment, the shaft 250 is threaded and extends radially outward through one of the forward hanger slot 240 and the aft hanger slot 241. The shaft 250 further extends through a hole 254 formed in the carrier 224 and the fastener nut 252 engages the threaded portion of the shaft 250 to couple each hanger 242, 243 to the carrier 224.

The bracket 248 of each hanger 242, 243 of the forward and aft hangers 242, 243 extends circumferentially partway about the axis 11 within the forward channel 234 or the aft channel 235 to form a T-shaped when viewed axially along the central axis 11. Each bracket 248 includes the radially-inwardly facing surface 246, a top surface 286, a first side 257, and a second side 259. The second side 259 is axially spaced apart from the first side 257 and the first and second sides 257, 259 extend between the radially-inwardly facing surface 246 and the top surface 286 to form a rectangular shape as shown in FIG. 7. In other embodiments, the bracket 248 may be another suitable shape.

Each bracket 248 is also shaped to include load pads 260 as shown in FIG. 9. The load pads 260 extend radially outward from the top surface 286 of the bracket 248 to engage the forward or aft flange 238, 239 of the attachment member 231 in the respective channel 234, 235. In the illustrative embodiment, each bracket 248 includes two load pads 260 spaced circumferentially apart from one another on either side of the shaft 250.

Each of the first side 257 and the second side 259 are shaped to include at least one attachment datum 262 as shown in FIG. 9. The at least one attachment datum 262 extends into the side 257, 259 of the bracket 248. In other embodiments, the first and second sides 257, 259 each include a plurality of attachment datums 262 circumferentially spaced apart along the length of the bracket 248.

The forward and aft heat shield hangers 244, 245 each include a shield panel 264, a first side clip 266, and a second side clip 268 as shown in FIGS. 7-9. The shield panel 264 is arranged between the radially-inwardly facing surface 246 of the respective hanger 242, 243 and the exterior surface 233 of the runner 230. The shield panel 264 extends the length of the radially-inwardly facing surface 246 to shield the radially-inwardly facing surface 246 from the radiant heating from the exterior surface 233 of the runner 233. The first side clip 266 extends radially outward from a first edge 274 of the shield panel 264 and along the first side 257 of the bracket 248. The second side clip 268 extends radially outward from a second edge 276 of the shield panel 264 spaced axially apart from the first edge 274 of the shield panel 266. The second side clip 268 extends along the second side 259 of the bracket 248. The clips 266, 268 extend along the sides 257, 259 of the bracket 248 to couple the heat shield 244, 245 to the respective hanger 242, 243.

In the illustrative embodiment, the shield panel 264, the first side clip 266, and the second side clip 268 of each hanger heat shield 244, 245 extends partway about the axis 11. The forward hanger heat shield 244 extends and couples to the plurality of forward hangers 242 that support the blade track segment 226. The aft hanger heat shield 245 extends and couples to the plurality of aft hangers 243 that support the blade track segment 226. In other embodiments, the forward and aft hanger heat shields 244, 245 may be annular and form a hanger heat shield loop.

The first side clip 266 and the second side clip 268 each include a wall 278, 282 and an attachment protrusion 280, 284 as shown in FIGS. 7-9. The wall 278, 282 extends radially outward from the first edge 274 of the shield panel 264 and along the first side 257 of the bracket 248. The attachment protrusion 280, 284 extends from the wall 278, 282 and into the attachment datum 262 formed in the first or second side 257, 259 of the bracket 248 to couple the hanger heat shield 244, 245 to the hanger 242, 243. In some embodiments, the bracket 248 may include the attachment protrusions 280, 284, while the clips 266, 268 of the hanger heat shields 242, 243 may include the attachment datum 262.

In the illustrative embodiment, each side clip 266, 268 includes at least one attachment protrusion 280, 284. In other embodiments, the side clips 266, 268 may include a plurality of attachment protrusions 280, 284 that extend into the plurality of attachment datums 262 formed in the brackets 248.

Turning again to the carrier 224, the carrier 224 includes a body plate 290, case hangers 291, forward and aft seal supports 292 as shown in FIG. 9. The body plate 290 is formed to include holes 254 through which the shafts 250 of the hangers 242, 243 extend. The case hangers 291 are configured to couple the shroud segment 22 to the outer casing 15 or other structure and extend radially outward from the body plate 290. The forward and aft seal supports 292 extend radially inward from the body plate 290. Each seal support 292 defines a corresponding seal-receiving channel 293 that receives a tandem seal 294 included in the shroud assembly 22.

In some embodiments, the carrier 224 may further include a locating feature. The locating feature may extend radially inward from the body plate 290 and be spaced axially aft of the forward seal support 292. The locating feature may engage the forward flange 238 of the blade track segment 226 to maintain engagement of the aft flange 239 with the aft seal support of the carrier 224 and block axial movement of the blade track segment 226 relative to the carrier 224. In some embodiments, the carrier 224 may include a plurality of locating features spaced circumferentially apart about the axis 11.

The present disclosure related to ceramic matrix composite seal segments, specifically ceramic seal segments 26, 226 with an I-beam shape when viewing the general cross-section of the ceramic matrix composite component 26, 226 as shown in FIGS. 3 and 7. In the illustrative embodiment, the top flanges 38, 39, 238, 239 of the I-beam may be bolted against the underside of the carrier 24, 224 by metallic hangers 42, 43, 242, 243 as shown in FIGS. 2-3 and 7-8.

The hangers 42, 43 with fasteners nuts 52 provide adjustability of the position of the blade track segment 26 relative to the carrier 24 and enable radially assembly of the blade track segment 26. Locating data points 96 formed in the underside of the carrier 24 locating the ceramic matrix composite segment 26. The fastener nuts 52 are tightened minimally and tack welded for anti-rotation. In some embodiments, other anti-rotaton features may be used such as deformed fastener nuts 52 or even lock wire.

In some embodiments, the carrier 24 may also include a protective coating or surface at each fastener nut 52. The protective coating or surface may be arranged so as to protect the carrier 24 where the nuts 52 are tightened fully.

In some embodiments, the forward hanger and the aft hanger may include several shafts per hanger. Each hanger may also include load pads to avoid edge loading. These hangers with multiple studs per hanger may provide redundancy so that carrier 24 or case failure may be managed.

If multiple, single stud hangers 42, 43 were used on each side of the blade track segment 26, then a large chunk of metal may be loose, captured within the backside cavity of the ceramic matrix composite seal segment 26 if the stud 50 were to fail. Additionally, other damage to the turbine 18 may occur if such a chunk of metal were free to move with engine vibration and shock loads such as damaging the back side of the ceramic seal segment 26.

However, while combining the individual hangers into a single components per side with multiple shafts allows one stud to fail without any loose pieces being liberated on the back side of the ceramic seal segment 26, such hangers are difficult to machine. Additionally, the multiple shafted hangers eliminate the ability to roll-form the threads, which decreases the fatigue life of the shafts. The number of contact points under the ceramic blade track segment 26 may be limited to no more than two in the multiple shafted hanger arrangement to accommodate the stiffness of the ceramic matrix composite material. In other embodiments, more contact points may be used.

Individual hangers 42, 43 may have two contact points or load pads 60 per hanger 42, 43, resulting in spreading the contact load across each side of the blade track 26 into six or eight points per side instead of two. Therefore, the load at the contact points with the individual hangers 42, 43 as shown in FIG. 3 is three or four times less than if two the multiple shafted hangers were used to couple the blade track segment 26 to the carrier.

In the illustrative embodiments, the temperatures of the metallic hooks 42, 43 may be much higher than expected in typical shroud segments. Little heat may be conducted through the contact locations at the load pads 60, since the contact area is very small and the contact location is relatively cool ceramic matrix composite material.

However, the radiation from the blade track segment 26, 226 may be a major factor in heating up the metallic hangers 42, 43, 242, 243. The radiation heating may be be significantly higher with ceramic matrix composite seal segments 26, 226 rather than historical metallic seal segments due to the backside 33, 233 of the ceramic segment 26, 226 running hundreds of degrees hotter. In some embodiments, a cooling flow may be provided and impinge on the hooks 42, 43, 242, 243 to keep the temperatures of the hooks 42, 43, 242, 243 low enough to provide adequate low cycle fatigue and creep life. Yet, the routing cooling flow to the hooks 42, 43, 242, 243 may result in additional parasitic flow which has a negative impact on SFC.

In some embodiments, each hanger 42, 43, 242, 243 may include a cooling hole extending radially therethrough to conduct flow to the pressure cavities formed on the forward and aft sides of the blade track segment 26 between the carrier 24 and the blade track segment 26. The cooling hole of each hanger 42, 43, 242, 243 may extend radially through the shaft 50, 250 and the body of the bracket 48, 248 to keep the hangers 42, 43, 242, 243 cool. In some embodiments, the cooling holes may be used for cooling the heat shields 44, 45, 244, 245 or for impingement cooling the backside or exterior surface 33, 233 of the blade track segment 26, 226.

In some embodiments, the hangers 42, 43, 242, 243 may not be truly radial, but parallel, radial to a centerplane of the carrier 24, 224. In this way, the segment 26, 226 may be easily assembled to the carrier 24, 224 and the slight angle of the shafts 50, 250 relative to the face of the carrier 24, 224 and the contact points of the segment 26, 226 may be taken up by the threads between the nuts and the shafts 50, 250.

In the illustrative embodiments, each of the shafts 50, 250 may include a neck down region where the diameter of the shaft 50, 250 transitions from a first diameter to a smaller second diameter. The neck down region is located at or near the threads on the shafts 50, 250 and isolates the threads formed on the shaft 50, 250 from stress concentrations that inherently occur at the base of the shaft 50, 250, which can increase the life of each hanger 42, 43, 242, 243. The neck down region may also aid in the manufacture of the rolled threads on the shafts 50, 250

The present disclosure related to implementing a heat shield 44, 45, 244, 245 to the assembly 22, 222 that enables an optimum design by managing metallic hook temperatures while enabling individual metallic hangers 42, 43, 242, 243. The heat shield components 44, 45, 244, 245 may be formed from a high temperature sheet metal, probably Waspaloy or Renee 100.

As shown in the embodiment of FIG. 3, the individual hangers 42, 43, may be pressed into place on the heat shield 44, 45 such that extensions 66, 68 on the heat shield 44, 45 spring over the top faces 81, 86 of the hangers 42, 43, capturing it in place on the heat shield 44, 45. A gap 77 generally remains between the radially-inwardly facing face 46 of the individual hangers 42, 43 and the heat shield 44, 45, protecting the hangers 42, 43 from radiation heat loading. The extensions 66, 68 on either end of the heat shield plate 64 (past the end face of the hanger) also protect the end faces from radiation heat loading.

The heat shields 44, 45 coupled to the individual hangers 42, 43 significantly lower temperature of the metallic hangers 44, 45 and eliminate radiation loading on the hangers 42, 43. The heat shields 44, 45 may improve the SFC, since no dedicated cooling flow may be necessary to manage the temperature of the hangers 42, 43. The heat shields 44, 45 may also enable implementing individual hangers 42, 43 by capturing the failed hangers 42, 43 within the seal segment backside cavity if the shaft 50 fails, thereby managing the failure mode.

The individual hangers 42, 43, 242, 243 may also be easier to manufacture and lower the overall cost. The individual hangers 42, 43, 242, 243 may also enable roll-forming of the threads on the shafts 50, 250 and siginificantly improve the fatigue life of the hangers 42, 43, 242, 243. The individual hangers 42, 43, 242, 243 may also enable two contact points or load pads 60, 260 per hanger 42, 43, 242, 243, increasing the number of contact points sharing the load by a factor of four in some cases. The increased contact points may also reduce the contact stresses within the ceramic matrix composite segment 26, 226 and share the load between the individual hangers 42, 43, 242, 243 better, reducing the hanger stress 42, 43, 242, 243.

The heat shields 44, 45, 244, 245 may also act an assembly aid by capturing the individual hangers 42, 43, 242, 243 in a grouped fashion, providing an extension on both ends, which can be used to hold the assembly.

In other embodiments, the hanger heat shields 44, 45, 244, 245 may be clipped to the hangers 42, 43, 242, 243 in another suitable arrangement. In the illustrative embodiment, the clip extensions 66, 68 may have an upturn 80, 84 at the end. This provides nice contact between the clip 66, 68 and the top face 81, 86 of the hanger 42, 43. However, this type of clip end 80, 84 may be difficult to assemble.

In other embodiments, clip ends without any upturn may also be possible, allowing the hanger 42, 43 to simply be pushed into place with the clips automatically snapping over the top face lip to capture the hanger 42, 43. In some embodiments, the clip extensions 66, 68 may be vertical and be bent over the hanger 42, 43 during the assembly process. In some embodiments, all clip extensions 66, 68 may extend over the top surfaces 81, 84. In other embodiments, only the clip extensions 66, 68 on one side may couple the heat shield 44, 45 to the hanger 42, 43.

The heat shield clip extensions 66, 68 may lay flat over contact pad locations such that it is captured between the metallic hanger 42, 43 and the mating component(s). The clip extension may include two contact pads contacting the underside of the ceramic matrix composite hanger or at the contact pad(s) on the aft face of the aft hangers which make axial contact with the carrier wall.

While the illustrative embodiment uses a single heat shield 44, 45, 244, 245 for a plurality of individual hangers 42, 43, 242, 243, in other embodiments, a heat shield may also be applied to each individual hanger to manage metallic hanger temperatures and reduce required cooling air flow (SFC improvement).

In other embodiment, the heat shields 42, 43, 242, 243 may be used to shield other hanger type arrangements, not just the I-beam concept. For instance, the hanger heat shields 42, 43, 242, 243 may easily be applied to a hanger concepts included other ceramic blade track concept designs. A heat shield may also be applied to a box section hanger.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A turbine shroud assembly comprising
a carrier configured to be coupled to a turbine case so as to fix other components of the turbine shroud assembly relative to the turbine case,
a blade track segment comprising ceramic matrix composite materials, the blade track segment including (i) a runner that extends at least partway about a central axis having a flow surface arranged to define a gas flow path and an exterior surface spaced radially outward of the flow surface relative to the central axis and (ii) an attachment member that extends radially outward from the exterior surface of the runner, and
a mounting assembly comprising a first metallic material configured to couple the blade track segment to the carrier, the mounting assembly including (i) a forward hanger that extends radially inward from the carrier and engages the attachment member of the blade track segment to block radially inward movement of the blade track segment relative to the carrier, (ii) an aft hanger spaced axially aft of the forward hanger that extends radially inward from the carrier and engages the attachment member of the blade track segment to block radially inward movement of the blade track segment relative to the carrier, the forward and aft hangers each having a radially-inwardly facing surface arranged in confronting relation to the exterior surface of the runner such that heat conducted from the flow surface of the runner to the exterior surface of the runner radiates toward the radially-inwardly facing surface of the forward and aft hangers, and (iii) hanger heat shields, each comprising a second metallic material different from the first metallic material, arranged radially between the exterior surface of the runner and the radially-inwardly facing surfaces of the forward and aft hangers to reduce the amount of heat transfer to the forward and aft hangers from the exterior surface of the runner during use of the turbine shroud assembly.

2. The turbine shroud assembly of claim 1, wherein each of the hanger heat shields includes a shield panel that is arranged between the exterior surface of the runner and the radially-inwardly facing surfaces of the forward and aft hangers and a first clip that extends radially outward from the shield panel and couples to a at least one of the forward and aft hangers.

3. The turbine shield of claim 2, wherein each of the hanger heat shields includes a second clip axially spaced apart from the first clip that extends radially outward from the shield panel and couples to at least one of the forward and aft hangers.

4. The turbine shroud assembly of claim 1, wherein the first material is a nickel-based super alloy or a cobalt-based super alloy and the second material is a nickel-based super alloy or a cobalt-based super alloy.

5. The turbine shroud assembly of claim 4, wherein the forward hanger and the aft hanger each include a bracket that engages one of a forward flange and an aft flange of the attachment member and a shaft that extends radially outward from the bracket to the carrier to couple the blade track segment to the carrier.

6. The turbine shroud assembly of claim 5, wherein the shaft extends radially outward from the bracket through a hole formed in the carrier and the shaft is formed to include threads that are engaged by a nut also included in the mounting system to selectively couple the corresponding hanger to the carrier.

7. The turbine shroud assembly of claim 2, wherein the mounting system includes a plurality of forward hangers spaced circumferentially apart around the central axis and a plurality of aft hangers spaced circumferentially apart around the central axis.

8. The turbine shroud assembly of claim 1, wherein the attachment member of the blade track segment includes a stalk that extends radially outward from the runner of the blade track, a forward flange that extends axially forward from the stalk at a radially outer end of the stalk to form a forward channel that opens axially forward, and an aft flange that extends axially aft from the stalk at the radially outer end of the stalk to form an aft channel that opens axially aft, and wherein the forward hanger and the aft hanger each include a bracket that engages one of the forward flange and the aft flange of the attachment member.

9. The turbine shroud assembly of claim 8, wherein the bracket includes a body coupled the shaft, an axially extending arm extends axially inward from the body into the respective forward or aft channel of the blade track segment, and load pads that extend radially outward from the axially extending arm at an end of the arm spaced axially inward from the body and engage the forward or aft flange of the attachment member in the respective channel.

10. The turbine shroud assembly of claim 8, wherein the bracket is T-shaped when viewed axially along the central axis.

11. A turbine shroud assembly comprising
a carrier configured to be coupled to a turbine case so as to fix other components of the turbine shroud assembly relative to the turbine case,
a blade track segment comprising ceramic matrix composite materials, the blade track segment including (i) a runner that extends at least partway about a central axis having a flow surface arranged to define a gas flow path and an exterior surface spaced radially outward of the flow surface relative to the central axis and (ii) an attachment member that extends radially outward from the exterior surface of the runner, and
a mounting assembly including (a) a hanger that comprises a first metallic material and extends radially inward from the carrier and engages the attachment member of the blade track segment to block radially inward movement of the blade track segment relative to the carrier, the hanger having a radially-inwardly facing surface spaced radially from and arranged in confronting relation to the exterior surface of the runner and (b) a hanger heat shield comprising a second metallic material different from the first metallic material, the hanger heat shield being coupled to the hanger and arranged radially between the exterior surface of the runner included in the blade track segment and the hanger to reduce the amount of heat transfer to the hanger from the radiant heating discharged from the runner included in the blade track segment, wherein hanger heat shield includes a shield panel that is arranged between the exterior surface of the runner and the radially-inwardly facing surface of the hanger to shield the corresponding hanger from radiant heat, a first clip that extends radially outward from the shield panel and engages a first side of the corresponding hanger, and a second clip axially spaced apart from the first clip that extends radially outward from the shield panel and engages a second side of the corresponding hanger.

12. The turbine shroud assembly of claim 11, wherein the hanger includes a bracket that engages the attachment member to block radially inward movement of the blade track segment and a shaft that extends radially outward from the bracket to the carrier to couple the blade track segment to the carrier.

13. The turbine shroud assembly of claim 12, wherein the shaft extends radially outward from the bracket through a hole formed in the carrier and the shaft is formed to include threads that are engaged by a nut also included in the mounting system to selectively couple the corresponding hanger to the carrier.

14. A turbine shroud assembly comprising
a carrier configured to be coupled to a turbine case so as to fix other components of the turbine shroud assembly relative to the turbine case,
a blade track segment comprising ceramic matrix composite materials, the blade track segment including (i) a runner that extends at least partway about a central axis having a flow surface arranged to define a gas flow path and an exterior surface spaced radially outward of the flow surface relative to the central axis and (ii) an attachment member that extends radially outward from the exterior surface of the runner, and
a mounting assembly including (a) a hanger that extends radially inward from the carrier and engages the attachment member of the blade track segment to block radially inward movement of the blade track segment relative to the carrier, the hanger having a radially-inwardly facing surface spaced radially from and arranged in confronting relation to the exterior surface of the runner and (b) a hanger heat shield arranged radially between the exterior surface of the runner included in the blade track segment and the hanger to reduce the amount of heat transfer to the hanger from the radiant heating discharged from the runner included in the blade track segment, wherein hanger heat shield includes a shield panel that extends at least partway about the central axis and is arranged between the exterior surface of the runner and the radially-inwardly facing surface of the hanger to shield the corresponding hanger from radiant heat, a first clip that extends radially outward from the shield panel and couples to a first side of the hanger, and a second clip axially spaced apart from the first clip that extends radially outward from the shield panel and couples to a second side of the corresponding hanger.

15. The turbine shroud assembly of claim 14, wherein the first clip of the hanger heat shield includes a first clip wall that extends radially outward from a first edge of the shield panel along the first side of the hanger and a first clip head that extends axially inward from the first clip wall and engages the bracket to couple the hanger heat shield to the hanger, and wherein the second clip of the hanger heat shield includes a second clip wall that extends radially outward form a second edge of the shield panel along the second side of the hanger and a second clip head that extends axially inward from the second clip wall and engages the bracket to couple the hanger heat shield to the hanger.

16. The turbine shroud assembly of claim 15, wherein the shield panel of the hanger heat shield is spaced radially inward of the radially-inwardly facing surface of the hanger to locate a gap therebetween to reduce the amount of heat transfer to the hanger from conductive heating caused by a temperature difference between the shield panel of the hanger heat shield and the radially-inwardly facing surface of the hanger during use of the turbine shroud assembly.

17. The turbine shroud assembly of claim 14, wherein the bracket of the hanger extends at least partway about the central axis and is shaped to include at least one attachment datum on a first side of the bracket that axially extends into the first side of the bracket and at least one attachment datum on a second side of the bracket that axially extends into the second side of the bracket.

18. The turbine shroud assembly of claim 17, wherein the first clip and the second clip of the hanger heat shield extend at least partway about the central axis, wherein the first clip includes an attachment protrusion that extends from the first clip into the attachment datum formed in the first side of the bracket to couple the first clip to the first side of the bracket, and wherein the second clip includes an attachment protrusion that extends from the second clip into the attachment datum formed in the second side of the bracket to couple the second clip to the second side of the bracket.

19. The turbine shroud assembly of claim 18, wherein the bracket of the hanger includes at least two load pads that extend radially outward from a top surface of the bracket and engage the attachment member of the blade track segment.

* * * * *